§ 371 (c)(1),

(12) United States Patent
Murakami

(10) Patent No.: US 9,078,233 B2
(45) Date of Patent: Jul. 7, 2015

(54) MOBILE TERMINAL DEVICE, NOTIFICATION METHOD, AND PROGRAM

(75) Inventor: Togo Murakami, Kawasaki (JP)

(73) Assignee: NEC CASIO MOBILE COMMUNICATIONS, LTD., Kawasaki-shi (JP)

( * ) Notice: Subject to any disclaimer, the term of this patent is extended or adjusted under 35 U.S.C. 154(b) by 145 days.

(21) Appl. No.: 13/881,132

(22) PCT Filed: Oct. 28, 2011

(86) PCT No.: PCT/JP2011/074952
(2), (4) Date: Apr. 23, 2013

(87) PCT Pub. No.: WO2012/057326
PCT Pub. Date: May 3, 2012

(65) Prior Publication Data
US 2013/0210487 A1    Aug. 15, 2013

(30) Foreign Application Priority Data

Oct. 28, 2010 (JP) ................................. 2010-241899

(51) Int. Cl.
*H04W 24/00* (2009.01)
*H04W 68/02* (2009.01)
(Continued)

(52) U.S. Cl.
CPC .......... *H04W 68/02* (2013.01); *H04M 1/72569* (2013.01); *H04M 1/72597* (2013.01); *H04M 2250/12* (2013.01); *G06F 3/017* (2013.01); *G06F 1/1694* (2013.01); *G06F 3/0481* (2013.01)

(58) Field of Classification Search
USPC ............... 455/347–349, 550.1, 575.1, 575.4, 455/575.8, 90.3, 412.3, 414.1, 456.1; 361/616, 667, 724–727, 769; 429/97, 429/100; 439/500
See application file for complete search history.

(56) References Cited

U.S. PATENT DOCUMENTS 5,848,362 A * 12/1998 Yamashita ..................... 455/567
6,813,491 B1 * 11/2004 McKinney ................. 455/414.1
(Continued)

FOREIGN PATENT DOCUMENTS

CN    101873386 A    10/2010
JP    2003-134189 A    5/2003
(Continued)

OTHER PUBLICATIONS

Communication dated Nov. 19, 2014 from the State Intellectual Property Office of the People's Republic of China in counterpart application No. 201180051652.2.

*Primary Examiner* — Dominic E Rego
(74) *Attorney, Agent, or Firm* — Sughrue Mion, PLLC

(57) ABSTRACT

A mobile terminal device includes: an event detection unit that detects an occurrence of a predetermined event; a notification unit that makes a notification of the occurrence of the event to a user of the mobile terminal device; an operating unit that receives a response operation with respect to the notification performed by the user of the mobile terminal device; a movement cycle acquisition unit that acquires a pattern cycle of spatial movement of the mobile terminal device; and a learning unit that learns a notification timing and a notification time based on the pattern cycle and a result of whether the operating unit has received the response operation. The notification unit makes the notification based on the notification timing and the notification time learned by the learning unit.

8 Claims, 6 Drawing Sheets

(51) Int. Cl.
*H04M 1/725* (2006.01)
*G06F 3/01* (2006.01)
*G06F 1/16* (2006.01)
*G06F 3/0481* (2013.01)

(56) References Cited

U.S. PATENT DOCUMENTS

| | | | |
|---|---|---|---|
| 6,874,934 B2* | 4/2005 | Brendel et al. | 378/197 |
| 8,438,127 B2* | 5/2013 | Kurata et al. | 706/48 |
| 8,676,224 B2* | 3/2014 | Louch | 455/456.1 |
| 2003/0162560 A1* | 8/2003 | Kaneko | 455/550 |
| 2006/0215641 A1* | 9/2006 | Kitagawa et al. | 370/352 |
| 2007/0041509 A1* | 2/2007 | Sawakuri | 379/27.01 |
| 2008/0103715 A1* | 5/2008 | Tsuda et al. | 702/81 |
| 2010/0039961 A1* | 2/2010 | Tallet et al. | 370/256 |
| 2010/0081418 A1* | 4/2010 | Chiashi | 455/414.1 |

FOREIGN PATENT DOCUMENTS

| | | |
|---|---|---|
| JP | 2007-135105 A | 5/2007 |
| JP | 2007-142843 A | 6/2007 |
| JP | 2008-099031 A | 4/2008 |
| JP | 2008-148155 A | 6/2008 |
| JP | 2008-167355 A | 7/2008 |
| JP | 2009-135675 A | 6/2009 |
| JP | 2009-290306 A | 12/2009 |

* cited by examiner

FIG. 3

|   | $\alpha$ | | | | |
|---|---|---|---|---|---|
|   | $\alpha 1$ | $\alpha 2$ | $\alpha 3$ | $\cdots$ | $\alpha m$ |
| $\beta 1$ | $\gamma 11$ | $\gamma 21$ | $\gamma 31$ | $\cdots$ | $\gamma m1$ |
| $\beta 2$ | $\gamma 12$ | $\gamma 22$ | $\gamma 32$ | $\cdots$ | $\gamma m2$ |
| $\beta\ \ \beta 3$ | $\gamma 13$ | $\gamma 23$ | $\gamma 33$ | $\cdots$ | $\gamma m3$ |
| $\vdots$ | $\vdots$ | $\vdots$ | $\vdots$ | $\vdots$ | $\vdots$ |
| $\beta n$ | $\gamma 1n$ | $\gamma 2n$ | $\gamma 3n$ | $\cdots$ | $\gamma mn$ |

MOBILE TERMINAL DEVICE, NOTIFICATION METHOD, AND PROGRAM

CROSS REFERENCE TO RELATED APPLICATIONS

This application is a National Stage of International Application No. PCT/JP2011/074952 filed Oct. 28, 2011, claiming priority based on Japanese Patent Application No. 2010-241899 filed Oct. 28, 2010, the contents of all of which are incorporated herein by reference in their entirety.

TECHNICAL FIELD

The present invention relates to a mobile terminal device, a notification method for at the time of making a notification to a user by the mobile terminal device, and a program for the notification method.

BACKGROUND ART

When a mobile terminal device makes a notification such as incoming call notification to a user, if the user is walking, the user may not realize the notification.

Patent Document 1 discloses a mobile terminal device that makes incoming call notification by detecting a user's action when the user performs the action, and shifts a phase away from that of the user's action rhythm according to the detection result.

In conjunction with the notification to the user, Patent Document 2 discloses a mobile electronic device that includes an acceleration sensor, and increases the rotation speed of a vibration motor when a moving state is detected, from that when the moving state is not detected.

Patent Document 3 discloses a mobile phone device that selects an incoming call notification mode based on peripheral sound and vibration of the own mobile phone device.

Patent Document 4 discloses an information management device that selects an incoming mode based on a key word of a personal schedule.

PRIOR ART DOCUMENTS

Patent Documents

Patent Document 1: Japanese Unexamined Patent Application, First Publication No. 2009-290306
Patent Document 2: Japanese Unexamined Patent Application, First Publication No. 2009-135675
Patent Document 3: Japanese Unexamined Patent Application, First Publication No. 2003-134189
Patent Document 4: Japanese Unexamined Patent Application, First Publication No. 2007-142843

SUMMARY OF THE INVENTION

Problem to be Solved by the Invention

According to Patent Document 1, a CPU of a mobile terminal device controls incoming call information with respect to an incoming call according to the user's action rhythm. Therefore, by appropriately controlling the incoming call information according to the action rhythm, the user can realize the information, thereby enabling to prevent delay in handling the incoming call effectively. However, in Patent Document 1, a determination method of specific timing for making incoming call information is not disclosed.

Moreover, the determination method of specific timing for making incoming call notification is not disclosed in Patent Documents 2 to 4.

An exemplary object of the present invention is to provide a mobile terminal device, an incoming call notification method, and a program that can solve the above-described problem.

Means for Solving the Problem

The present invention has been achieved in order to solve the above problems. A mobile terminal device according to an exemplary aspect of the present invention includes: an event detection unit that detects an occurrence of a predetermined event; a notification unit that makes a notification of the occurrence of the event to a user of the mobile terminal device; an operating unit that receives a response operation with respect to the notification performed by the user of the mobile terminal device; a movement cycle acquisition unit that acquires a pattern cycle of spatial movement of the mobile terminal device; and a learning unit that learns a notification timing and a notification time based on the pattern cycle and a result of whether the operating unit has received the response operation. The notification unit makes the notification based on the notification timing and the notification time learned by the learning unit.

A notification method according to an exemplary aspect of the present invention includes the steps of: detecting an occurrence of a predetermined event; making a notification of the occurrence of the event to a user of a mobile terminal device; receiving a response operation with respect to the notification performed by the user of the mobile terminal device; acquiring a pattern cycle of spatial movement of the mobile terminal device; and learning a notification timing and a notification time based on the pattern cycle and a result of whether the response operation has been received. In the step of making the notification, the notification is made based on the notification timing and the notification time learned in the step of learning.

A program according to an exemplary aspect of the present invention causes a mobile terminal device to execute the steps of: detecting an occurrence of a predetermined event; making a notification of the occurrence of the event to a user of t mobile terminal device; receiving a response operation with respect to the notification performed by the user of the mobile terminal device; acquiring a pattern cycle of spatial movement of the mobile terminal device; and earning a notification timing and a notification time based on the pattern cycle and a result of whether the response operation has been received. The program causes, in the step of making a notification, the notification to be made based on the notification timing and the notification time learned in the step of learning.

Effect of the Invention

According to the present invention, the notification timing can be determined such that a user can realize the notification easily.

BRIEF DESCRIPTION OF THE DRAWINGS

FIG. 3 shows a relation between coefficients α and β and a learning parameter γ indicating a selection probability of these coefficients α and β, in the exemplary embodiment of the present invention.

EMBODIMENTS FOR CARRYING OUT THE INVENTION

Hereunder exemplary embodiments of the present invention will be described, with reference to the drawings.

Figure 1:
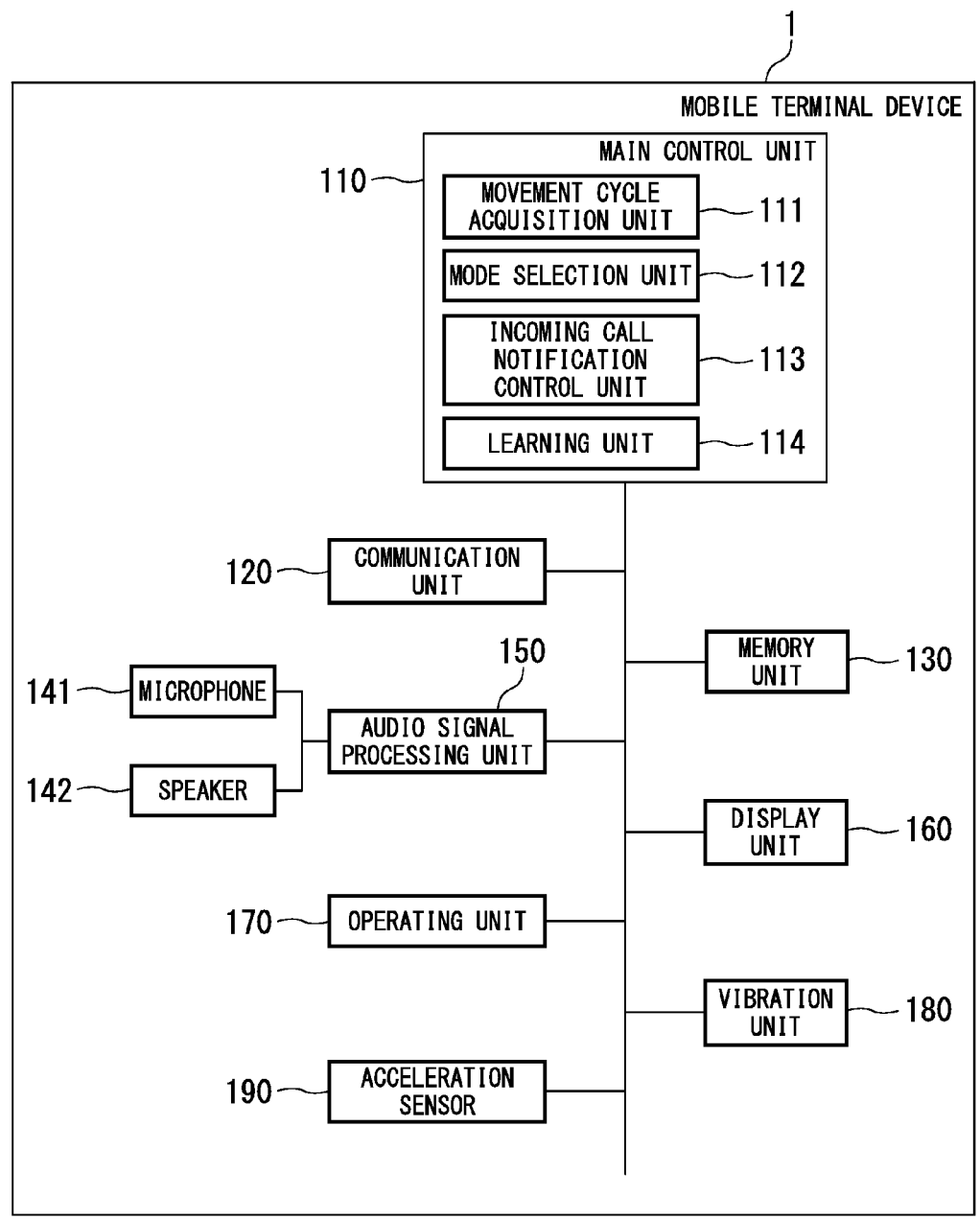
FIG. 1 is a configuration diagram showing a schematic configuration of a mobile terminal device, in an exemplary embodiment of the present invention.

FIG. 1 is a configuration diagram showing a schematic configuration of a mobile terminal device 1, in an exemplary embodiment of the present invention. In FIG. 1, the mobile terminal device 1 includes a main control unit 110, a communication unit (event detection unit) 120, a memory unit 130, a microphone 141, a speaker 142, an audio signal processing unit 150, a display unit 160, an operating unit 170, a vibration unit (notification unit) 180, and an acceleration sensor 190. The main control unit 110 includes a movement cycle acquisition unit 111, a mode selection unit 112, an incoming call notification control unit 113, and a learning unit 114.

The mobile terminal device 1 performs radio communication with a base station device. The mobile terminal device 1 performs various functions such as a telephone function, an electronic mail function, and a network connection function such as Web access based on a user's operation or a reception signal from the base station device.

The communication unit 120 outputs a radio signal received from the base station device, to the main control unit 110. The communication unit 120 transmits a transmission signal output from the main control unit 110, to the base station device by a radio signal.

Upon detection of an incoming signal of the radio signal transmitted from the base station device to the mobile terminal device 1, the communication unit 120 outputs a signal informing the incoming call to the main control unit 110. The incoming call is an example of the occurrence of a predetermined event. The "event" referred to herein accompanies a notification to the user.

The memory unit 130 stores a program to be executed by the main control unit 110, and various pieces of data.

The microphone 141 collects peripheral sound and converts it to a voice signal. The speaker 142 outputs voice upon reception of an input of the voice signal.

The audio signal processing unit 150 converts a digital voice signal input from the main control unit 110 to an analog voice signal, and outputs it to the speaker 142. Further, the audio signal processing unit 150 converts an analog voice signal input from the microphone 141 to a digital voice signal, and outputs it to the main control unit 110.

The display unit 160 has a display screen such as a high-definition liquid-crystal display or an organic EL display. The display unit 160 displays characters, still images, motion pictures, and the like on the display screen according to an image signal output from the main control unit 110.

The operating unit 170 includes various buttons, such as a ten-key keypad, a direction button, and a determination button, and a dial. The operating unit 170 receives an operation performed by the user of the mobile terminal device 1. The operating unit 170 outputs a signal indicating the received operation to the main control unit 110.

The vibration unit 180 is constituted by a vibration motor. When the communication unit 120 receives a radio signal, the vibration unit 180 vibrates the body of the mobile terminal device 1 by the vibration motor under control of the main control unit 110, thereby making an incoming call notification to the user. The incoming call notification is an example of event occurrence notification.

The acceleration sensor 190 measures a rate of acceleration at which the mobile terminal device 1 spatially moves. For example, spatial movement of the mobile terminal device 1 is performed by performing an action such as walking or running in a state with the mobile terminal device 1 being put in a pocket of trousers, and the acceleration sensor 190 measures the rate of acceleration generated by the spatial movement.

The main control unit 110 is realized by a central processing unit (CPU) included in the mobile terminal device 1 reading and executing the program stored in the memory unit 130. The main control unit 110 performs control of the respective units to execute various functions such as the telephone function, the electronic mail function, and the network connection function such as Web access. Specifically, the main control unit 110 determines incoming call notification start timing and incoming call notification time of the vibration unit 180 (as described later, selects one from a plurality of preset values). Next, the main control unit 110 controls the vibration unit 180 to make incoming call notification according to the determined incoming call notification start timing and the incoming call notification time. The incoming call notification start timing is an example of notification timing. The incoming call notification time is an example of notification time.

The movement cycle acquisition unit 111 acquires a pattern cycle of spatial movement of the mobile terminal device 1, based on the rate of acceleration measured by the acceleration sensor 190. The pattern cycle of spatial movement of the mobile terminal device 1 indicates a repetition cycle when the mobile terminal device 1 performs spatial movement repeatedly substantially in a certain pattern.

The movement cycle acquisition unit 111 extracts time indicating a characteristic change in the spatial movement of the mobile terminal device 1 such as time at which movement of the mobile terminal device 1 is reversed from upward (an opposite direction to gravity) to downward (a direction of gravity). The movement cycle acquisition unit 111 calculates a time during which the extracted characteristic change is repeated, thereby acquiring the pattern cycle of the spatial movement of the mobile terminal device 1.

The incoming call notification control unit 113 determines the incoming call notification start timing and the incoming call notification time of the vibration unit 180, and controls the vibration unit 180 so as to make incoming call notification according to the determined incoming call notification start timing and incoming call notification time.

The learning unit 114 learns the incoming call notification start timing and the incoming call notification time based on the pattern cycle of the spatial movement of the mobile terminal device 1 and the presence of a response to the incoming call by the user.

The mode selection unit 112 determines a processing mode in which the incoming call notification control unit 113 determines the incoming call notification start timing and the incoming call notification time, to either of a random selection mode and a learning result use mode. As described later, the random selection mode is for determining the incoming call notification start timing and the incoming call notification time at random. On the other hand, the learning result use mode is for determining the incoming call notification start timing and the incoming call notification time, based on the learning result acquired by the learning unit 114.

Figure 2:
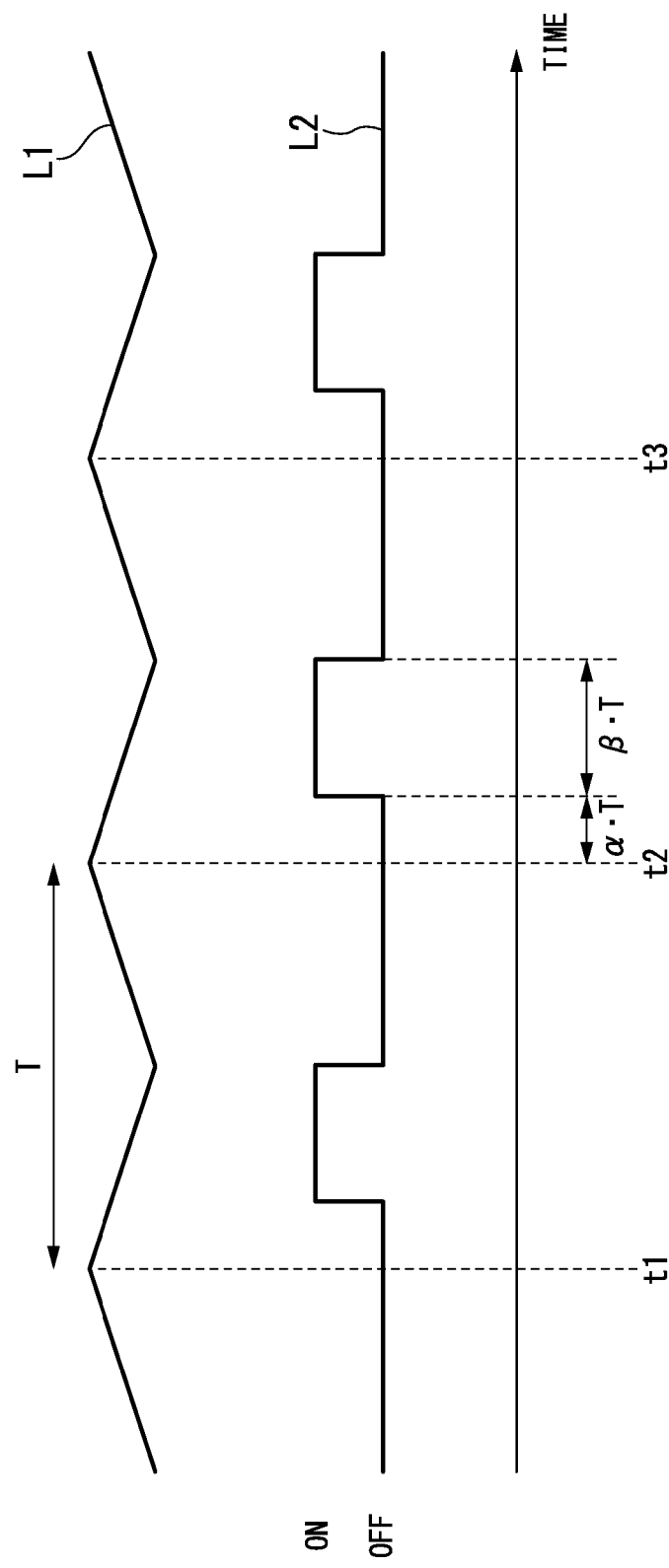
FIG. 2 shows an example of a movement pattern of the mobile terminal device, and incoming call notification made by a vibration unit, in the exemplary embodiment of the present invention.

Next, with reference to FIG. 2, is a description of the incoming call notification start timing and the incoming call notification time when the vibration unit 180 makes incoming call notification.

FIG. 2 shows an example of the movement pattern of the mobile terminal device 1, and incoming call notification made by the vibration unit 180. The X-axis in FIG. 2 denotes time. The line L1 in FIG. 2 shows the movement pattern of the mobile terminal device 1. The line L1 shows the magnitude of acceleration measured by the acceleration sensor 190. The line L2 in FIG. 2 shows an example of incoming call notification made by the vibration unit 180. The line L2 shows ON (notified)/OFF (not notified) of the incoming call notification made by the vibration unit 180. Hereunder, the repetition pattern of ON and OFF of the incoming call notification such as shown by the line L2 in FIG. 2 is referred to as "incoming call notification pattern".

Times t1, t2, t3, and so forth in FIG. 2 denote time at which the magnitude of acceleration shifts from an increase to a decrease as an example of time at which the movement pattern indicates a characteristic change. The cycle T denotes an average of a time interval between times indicating these characteristic changes (average of t2−t1, t3−t2, and so forth).

The movement cycle acquisition unit 111 extracts times t1, t2, t3, and so forth indicating a characteristic change, from the movement pattern of the mobile terminal device 1 indicated by the line L1. The movement cycle acquisition unit 111 then calculates an average of the time interval between times indicating these characteristic changes, to acquire a pattern cycle T of the spatial movement (hereinafter, referred to as "movement cycle T").

A value used by the movement cycle acquisition unit 111 for acquiring the movement cycle T is not limited to the magnitude of acceleration shown in FIG. 2 and can be a value that can extract a time indicating a characteristic change in the spatial movement of the mobile terminal device 1. For example, the movement cycle acquisition unit 111 can use a value other than the magnitude of acceleration, such as an acceleration vector value measured by the acceleration sensor 190, or a vertical component of the acceleration vector.

When the mobile terminal device 1 is for example, a mobile phone, the mobile terminal device 1 is generally used continuously for long periods of time in many cases. On the other hand, the pattern cycle T changes from moment to moment according to the operating conditions of the user. Therefore, if the movement cycle acquisition unit 111 calculates the pattern cycle T based on the movement pattern over a long period of time, movement patterns for a plurality of types of operations performed by the user are included. As a result, the pattern cycle T of the current movement pattern may not be acquired.

Therefore, the movement cycle acquisition unit 111 calculates the pattern cycle T based on the latest movement pattern. For example, the movement cycle acquisition unit 111 calculates an average of the most recent predetermined number of (for example, three most recent) time intervals to acquire the pattern cycle T.

Time $\alpha \cdot T$ shown in FIG. 2 is an example of the incoming call notification start timing of the vibration unit 180, and shows the time since the movement pattern showed a characteristic change, until the vibration unit 180 starts to make incoming call notification. This time is acquired by multiplying the movement cycle T by a coefficient $\alpha$. The coefficient $\alpha$ will be described later.

Time $\beta \cdot T$ shows the incoming call notification time of the vibration unit 180. This time is acquired by multiplying the movement cycle T by a coefficient $\beta$. The coefficient $\beta$ will be described later.

Next, with reference to FIG. 3, is a description of the coefficient $\alpha$ of the incoming call notification start timing, the coefficient $\beta$ of the incoming call notification time, and a learning parameter $\gamma$.

FIG. 3 shows a relation between the coefficients $\alpha$ and $\beta$ used at the time of making the incoming call notification, and the learning parameter $\gamma$ indicating a selection probability of combinations of these coefficients $\alpha$ and $\beta$. As shown in FIG. 2, the coefficient $\alpha$ indicates the incoming call notification start timing of the vibration unit 180, and the coefficient $\beta$ indicates the incoming call notification time of the vibration unit 180.

Values $\alpha 1$ to $\alpha m$ (m is a positive integer) shown in FIG. 3 are different values preset as values of the coefficient $\alpha$, and stored in the memory unit 130 beforehand. Values $\beta 1$ to $\beta n$ (n is a positive integer) are different values preset as values of the coefficient $\beta$, and stored in the memory unit 130 beforehand.

A value $\alpha i$ (i is a positive integer of $1 \le i \le m$) is set within a range of $0 \le \alpha i < 1$. Similarly, a value $\beta j$ (j is a positive integer of $1 \le j \le n$) is set within a range of $0 \le \beta j < 1$. The value $\beta j$ can have a size of a certain amount or larger such as $0.2 \le \beta j < 1$, so that the incoming call notification time of the vibration unit 180 does not become extremely short.

A value $\gamma ij$ is a parameter value indicating a probability of combinations of values $\alpha i$ and $\beta j$ selected by the incoming call notification control unit 113. The value $\gamma ij$ is stored in the memory unit 130, and is updated by the learning unit 114. The value $\gamma ij$ is set and updated so that the sum total becomes 1, that is, so that Equation (1) is established.

$$\sum_{i=1}^{m}\sum_{j=1}^{n} r_{ij} = 1 \qquad \text{Equation (1)}$$

An initial value of the value $\gamma ij$ is set so that every learning parameter $\gamma$ becomes uniform, for example, as in Equation (2).

$$r_{ij} = \frac{1}{m \cdot n} \qquad \text{Equation (2)}$$

As the value $\gamma ij$ becomes larger, the probability of making the incoming call notification based on the combination of values $\alpha i$ and $\beta j$ increases. Therefore, as described later, when there is a response to the incoming call by the user, the learning unit 114 increases the value $\gamma ij$. Accordingly, when the vibration unit 180 makes the incoming call notification, the probability of making the incoming call notification increases at the incoming call notification start timing and the incoming call notification time, at which there was a response to the incoming call in the past.

Figure 4:
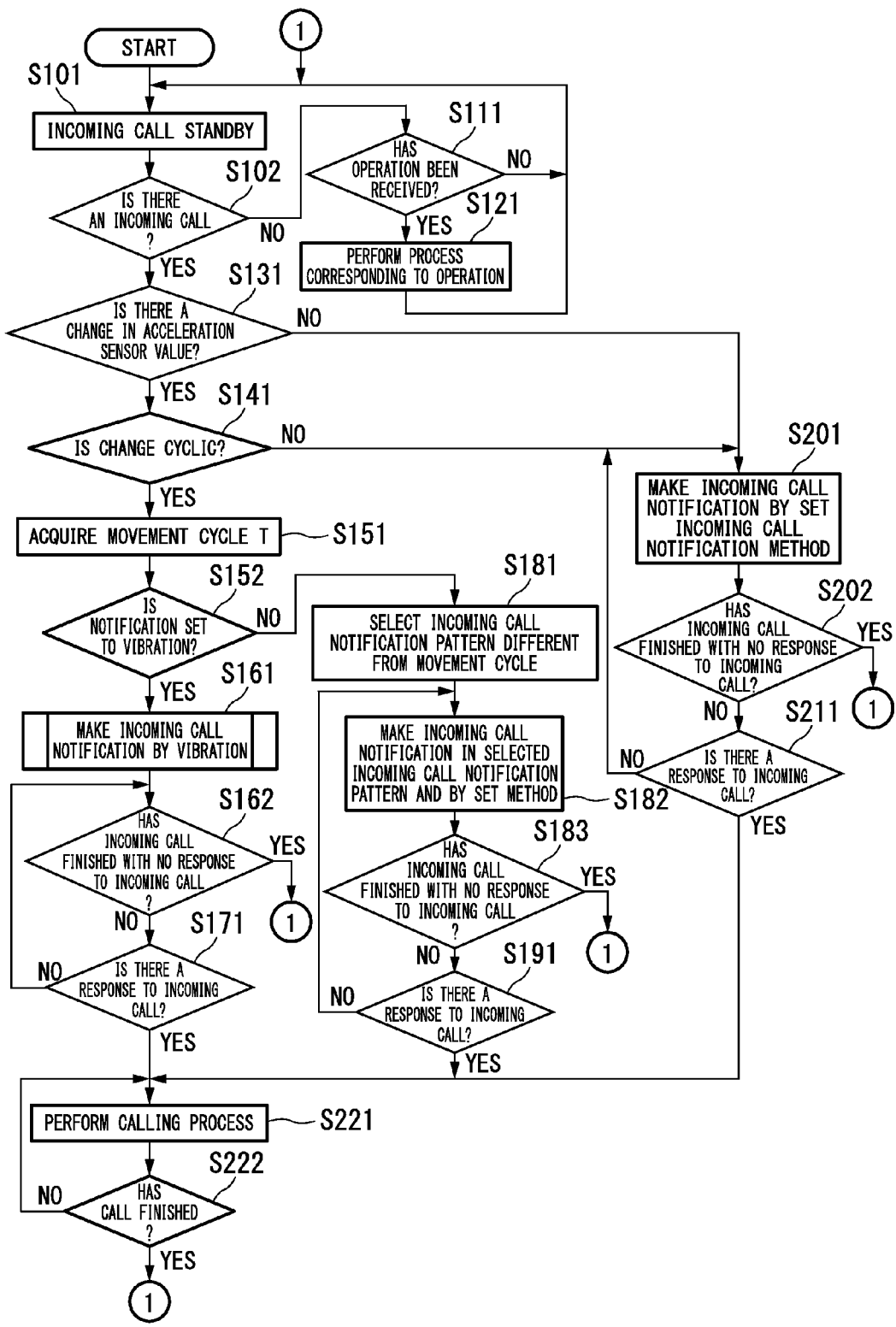
FIG. 4 is a flowchart showing an operation example of the mobile terminal device in the exemplary embodiment of the present invention.
Figure 5:
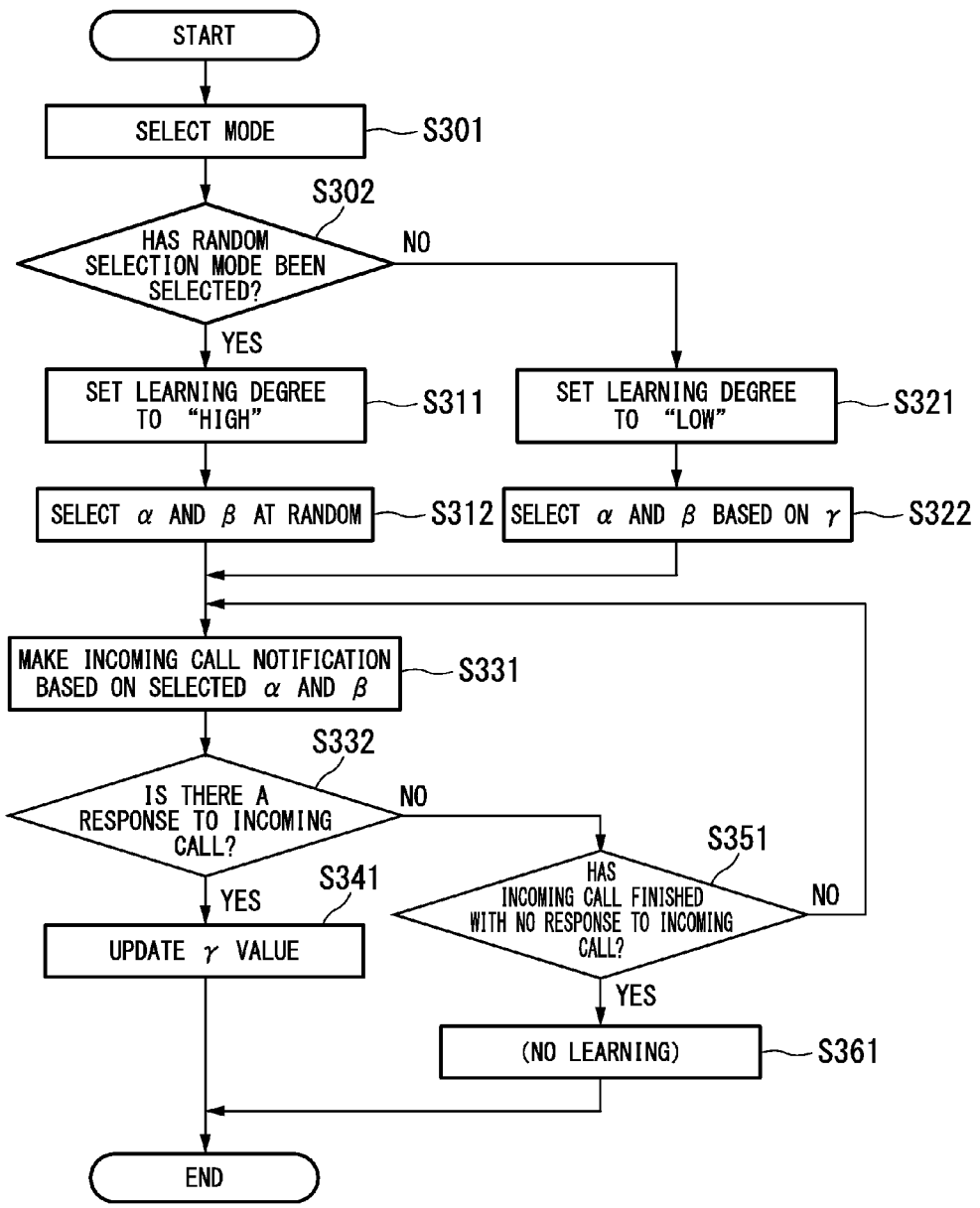
FIG. 5 is a flowchart showing a process procedure in which the mobile terminal device makes incoming call notification by vibration, in the exemplary embodiment of the present invention.

Next, with reference to FIG. 4 and FIG. 5, is a description of the operation of the mobile terminal device 1.

FIG. 4 is a flowchart showing an operation example of the mobile terminal device 1. The mobile terminal device 1 performs the processes in FIG. 4 and FIG. 5, from turning on a power source (power on) until turning off the power source (power off).

The process shown in FIG. 5 performed in step S161 in FIG. 4 is the characteristic process in the present exemplary embodiment of the present invention.

First, the main control unit 110 transmits a position registration request for requesting registration of the current position of the mobile terminal device 1, to the base station device via the communication unit 120, and causes the display unit 160 to display a predetermined standby screen to become a standby mode (step S101).

In the standby mode, the main control unit 110 determines the presence of an incoming call (whether the communication unit 120 detects an incoming call) (step S102). When it is determined that there is no incoming call (step S102: NO), the main control unit 110 determines whether the operating unit 170 has received an operation of the user (step S111).

When it is determined that the operating unit 170 has received the operation (step S111: YES), the main control unit 110 performs a process corresponding to the operation (step S121). For example, when an electronic mail is created and a transmission operation is performed, the main control unit 110 creates the electronic mail corresponding to the operation, and transmits it to the base station device via the communication unit 120. Alternatively, when a calling operation is performed, the main control unit 110 transmits a call setting request to the base station device via the communication unit 120.

Thereafter, the processing returns to step S101, and becomes the standby mode again. In step S111, when determined that the operating unit 170 has not received an operation of the user (step S111: NO), the processing returns to step S101, and becomes the standby mode.

On the other hand, when it is determined that there is an incoming call at step S102 (step S102: YES), the main control unit 110 determines the presence of a rate change of acceleration measured by the acceleration sensor 190 (step S131). That is, determines whether the mobile terminal device 1 is moving. When it is determined that there is a rate change of acceleration (step S131: YES), that is, when it is determined that the mobile terminal device 1 is moving, the main control unit 110 determines whether the rate change of acceleration is cyclic (step S141).

For example, the movement cycle acquisition unit 111 extracts the time (times t1, t2, t3, and so forth in FIG. 2) indicating a characteristic change (in the present exemplary embodiment, shift of the magnitude of acceleration from an increase to a decrease) at all times, from the movement pattern of the mobile terminal device 1, and stores the extracted time in the memory unit 130. When newly extracting a time indicating a characteristic change, the movement cycle acquisition unit 111 reads the previous time from the memory unit 130 to calculate the time interval, which is then stored in the memory unit 130. Accordingly, the memory unit 130 stores the time intervals (t2–t1, t3–t2, t4–t3, and so forth) each time. The main control unit 110 selects the largest value and the smallest value from the latest five time intervals stored in the memory unit 130. When a difference between the largest value and the smallest value is equal to or lower than a predetermined threshold, the main control unit 110 determines that the rate change of acceleration is cyclic. On the other hand, when the difference is larger than the threshold, the main control unit 110 determines that the rate change of acceleration is not cyclic.

When it is determined that the rate change of acceleration is not cyclic in step S141 (step S141: NO), and when it is determined that there is no rate change of acceleration in step S131 (step S131: NO), the main control unit 110 performs control of the relevant part so as to make the incoming call notification by the set incoming call notification method (step S201).

For example, when a ringtone notification is set, the main control unit 110 controls the audio signal processing unit 150 to make the incoming call notification by the set ringtone. Alternatively, when a vibration notification is set, the main control unit 110 controls the vibration unit 180 to make the incoming call notification by vibration.

In this case, the main control unit 110 does not perform control of the incoming call notification start timing or the incoming call notification time based on the movement pattern of the mobile terminal device 1. For example, in the case of the ringtone notification, the speaker 142 continuously sounds the set ringtone (not for each certain time interval).

The main control unit 110 determines whether there is no response to the incoming call by the user (that is, the operating unit 170 does not receive a response operation to the incoming call), and the incoming call has finished (that is, the communication unit 120 is a state of not detecting the incoming call) (step S202).

When it is determined that there is no response to the incoming call and the incoming call has finished (step S202: YES), the processing returns to step S101, and becomes the standby mode. On the other hand, when it is determined that there is no response to the incoming call and the incoming call has not finished (step S202: NO), the main control unit 110 determines the presence of the response to the incoming call, that is, whether the operating unit 170 has received the response operation to the incoming call by the user (step S211).

When it is determined that there is no response to the incoming call (step S211: NO), returns to step S201, and continuously makes the incoming call notification. On the other hand, when it is determined that there is incoming call notification (step S211: YES), the process proceeds to step S221, and the mobile terminal device 1 becomes a call enabled mode.

In step S141, it is determined that the rate change of acceleration is cyclic (step S141: YES), the movement cycle acquisition unit 111 acquires the movement cycle T (FIG. 2) (step S151). Moreover, the main control unit 110 determines whether the incoming call notification method is set to vibration (step S152).

When it is determined that the incoming call notification method is not set to vibration (step S152: NO), the main control unit 110 selects an incoming call notification pattern different from the movement cycle T. Specifically, the main control unit 110 selects a non-periodic incoming call notification pattern (for example, a pattern in which notification and no notification are alternately performed at random time), or an incoming call notification pattern having a different cycle from the movement cycle T (step S181), from the incoming call notification patterns stored in the memory unit 130. For example, the main control unit 110 selects one incoming call notification pattern at random from the incoming call notification patterns stored beforehand in the memory unit 130.

The main control unit 110 controls the relevant part so as to make the incoming call notification according to the incoming call notification pattern selected in step S181. For example, when the ringtone notification is set, the main control unit 110 controls the audio signal processing unit 150 so that the speaker 142 repeats ON (audio output) and OFF (speaker off) of the set ringtone according to the selected the incoming call notification pattern.

Thus, because the mobile terminal device 1 repeats ON/OFF of the incoming call notification, the possibility that the user notices the incoming call notification can be increased by using such human perception characteristics that a changing state can be detected more easily than a steady state.

For, example, the possibility that the user notices the incoming call notification can be increased by changing ON/OFF of the ringtone repeatedly rather than continuously outputting the ringtone by the speaker 142. A case in which the mobile terminal device 1 includes a light emitting diode (LED) indicator to make the incoming call notification by emitting light by the indicator will be described below. Also in this case, the possibility that the user notices the incoming call notification can be increased by giving a change by repeating ON/OFF of the indicator rather than by a state in which the indicator is kept lighting.

Moreover, the possibility that the user recognizes that the ringtone or the like is generated due to a different reason from the movement of the mobile terminal device 1, increases by making the incoming call notification by an incoming call notification pattern different from the movement cycle T, thereby enabling to increase the possibility that the user notices the incoming call notification.

For example, when the user is walking with the mobile terminal device 1 being put in a pocket of trousers, a cyclical contact sound may be generated periodically due to contact between the contents such as a key in the pocket and the mobile terminal device 1. Therefore, the possibility that the user notices the incoming call notification can be increased by generating a ringtone of a different pattern from the periodic sound, by the speaker 142.

Thereafter, the main control unit 110 determines whether the incoming call has finished with no response of the user to the incoming call (step S183).

When the main control unit 110 determines that there is no response to the incoming call and the incoming call has finished (step S183: YES), the process returns to step S101, and becomes the standby mode. On the other hand, when it is determined that there is no response to the incoming call and the incoming call has not finished (step S183: NO), the main control unit 110 determines the presence of a response to the incoming call (step S191).

When the main control unit 110 determines that there is no response to the incoming call (step S191: NO), returns to step S182, and continuously makes the incoming call notification. On the other hand, when the main control unit 110 determines that there is an incoming call notification (step S191: YES), proceeds to step S221, and the mobile terminal device 1 becomes the call enabled mode.

In step S152, when the main control unit 110 determines that the incoming call notification method is set to vibration (step S152: YES), the mobile terminal device 1 makes the incoming call notification by vibration (step S161). The incoming call notification made by vibration will be described later.

Then the main control unit 110 determines whether the incoming call has finished with no response of the user to the incoming call (step S162).

When the main control unit 110 determines that there is no response to the incoming call and the incoming call has finished (step S162: YES), returns to step S101, and becomes the standby mode. On the other hand, when it is determined that there is no response to the incoming call and the incoming call has not finished (step S162: NO), the main control unit 110 determines the presence of a response to the incoming call (step S171).

When the main control unit 110 determines that there is no response to the incoming call (step S171: NO), returns to step S161, and continuously makes the incoming call notification. On the other hand, when it is determined that there is an incoming call notification (step S171: YES), proceeds to step S221, and the mobile terminal device 1 becomes the call enabled mode.

In step S221, the mobile terminal device 1 performs a calling process.

Specifically, the main control unit 110 converts voice extracted by the microphone 141 to a radio signal, and transmits it to the base station device via the communication unit 120. Moreover, the main control unit 110 extracts voice data from the signal received by the communication unit 120, and causes the speaker 142 to output the voice.

Then the main control unit 110 determines whether the call has finished (step S222). Specifically, when the operating unit 170 receives a call termination operation and when the communication unit 120 receives notification of call termination, the main control unit 110 determines that the call has finished.

When the main control unit 110 determines that the call has not finished (step S222: NO), returns to step S221, and continuously performs the calling process. On the other hand, when the main control unit 110 determines that the call has finished (step S222: YES), returns to step S101, and becomes the standby mode.

FIG. 5 is a flowchart showing a process procedure in which the mobile terminal device 1 makes incoming call notification by vibration. The mobile terminal device 1 performs a process shown in FIG. 5, in step S161 in FIG. 4.

At first, the mode selection unit 112 selects either of the "random selection mode" and the "learning result use mode" (step S301).

The "random selection mode" is a mode in which the incoming call notification control unit 113 selects the values of the coefficients $\alpha$ and $\beta$ at random without using the value of the parameter $\gamma$, which is the learning result. The "learning result use mode" is a mode for selecting the coefficients $\alpha$ and $\beta$ based on the value of the parameter $\gamma$.

When learning progresses to some extent, the learning result may not always be appropriate. Therefore, the "random selection mode" is provided, and the mobile terminal device 1 makes the incoming call notification without using the learning result to perform learning based on the result thereof. Accordingly, when the learning result is not appropriate, the learning result can be diverged to some extent so that the learning result is not converged.

The mode selection unit 112 increases the probability of selecting the random selection mode as a bias of the $\gamma$ distribution decreases, and decreases the probability of selecting the random selection mode as the bias of the $\gamma$ distribution increases. For example, as the $\gamma$ distribution, a standard deviation of the value $\gamma 11$ to $\gamma mn$ is calculated, and the calculated standard deviation is multiplied by a predetermined coefficient $\delta$ ($0<\delta \leq 1$) to select the learning result use mode with the probability of the multiplication result value. Alternatively, the mode selection unit 112 may select the mode by a method other than the method of using the value multiplied by the coefficient $\delta$, for example, by selecting the learning result use mode at the probability of the calculated standard deviation value.

Thus, by increasing the probability of selecting the random selection mode as the bias of the $\gamma$ distribution decreases, the probability of selecting the coefficients $\alpha$ and $\beta$ at random is increased in a stage in which learning has not progressed, and the incoming call notification is made based on various coefficients α and β, that is, evenly to perform learning. As a result, the possibility of converging on a learning result which is not appropriate, without making a single incoming call notification based on the appropriate coefficients α and β can be decreased.

The mode selection unit 112 can use a selection method other than selecting the random selection mode based on the bias of the γ distribution, for example, by selecting the random selection mode at a predetermined probability. When the mode selection unit 112 selects the random selection mode at the predetermined probability, the burden of the mobile terminal device 1 can be reduced in terms of not needing to calculate the bias of the γ distribution.

The main control unit 110 selects a process to be performed next according to the mode selected by the mode selection unit 112 (step S302). When the mode selection unit 112 selects the random selection mode (step S302: YES), the main control unit 110 sets a learning degree to be high (step S311). The learning degree will be described later.

Moreover, the incoming call notification control unit 113 selects the values of the coefficients α and β at random from the values of the coefficient α (α1 to αm in FIG. 3) and the values of the coefficient β (β1 to βn) stored in the memory unit 130.

Subsequently, the process proceeds to step S331, and the mobile terminal device 1 makes the incoming call notification.

When the mode selection unit 112 selects the learning result use mode (step S302: NO), the main control unit 110 sets the learning degree to be low (step S321).

Moreover, the incoming call notification control unit 113 selects one combination from the combinations of the values of the coefficients α and β stored in the memory unit 130 at the probability of the value of the parameter γ described in FIG. 3 (step S322).

Then the process proceeds to step S331, and the mobile terminal device 1 makes the incoming call notification.

In step S331, the incoming call notification control unit 113 multiples the values of the coefficients α and β selected in step S312 or step S322 by the value of the movement cycle T acquired by the movement cycle acquisition unit 111 in step S151, to calculate the incoming call notification start timing α·T and the incoming call notification time β·T. The incoming call notification start timing α·T is a time since the movement pattern of the mobile terminal device 1 indicated a characteristic change until the vibration unit 180 starts the incoming call notification as described with reference to FIG. 2. The incoming call notification control unit 113 controls the vibration unit 180 so as to make the incoming call notification at the calculated incoming call notification start timing α·T and incoming call notification time β·T.

The main control unit 110 determines the presence of a response to the incoming call (step S332). When the main control unit 110 has determined that there is a response to the incoming call (step S332: YES), the learning unit 114 updates the γ value stored in the memory unit 130. Specifically, the learning unit 114 increases the value of the parameter γij corresponding to the combination of the values αi and βj selected in step S312 or S322. Moreover, the learning unit 114 decreases the values of the parameter γ other than the parameter γij so that the sum total of the γ values becomes 1.

As shown in steps S311 and S321, the main control unit 110 increases the learning degree in the random selection mode, and decreases the learning degree in the learning result use mode. That is, in the random selection mode, the main control unit 110 changes the γ value largely based on the learning result. Accordingly, the learning result in the random selection mode is easily reflected, and when the learning result is not appropriate, the effect of diverging learning to some extent can be easily acquired so that the learning result is not converged.

Thereafter, the process in FIG. 5 finishes, and the process proceeds to step S162 in FIG. 4.

When it is determined that there is no response to the incoming call in step S332 (step S332: NO), the main control unit 110 determines whether incoming call has finished with no response to the incoming call. When the main control unit 110 determines that there is no response to the incoming call and the incoming call has not finished (step S351: NO), returns to step S331, and the vibration unit 180 continuously makes the incoming call notification. On the other hand, when the main control unit 110 determines that there is no response to the incoming call and the incoming call has finished (step S351: YES), it does not update the γ value (step S361), and finishes the process in FIG. 5 and proceeds to step S162 in FIG. 4.

In step S361, the learning unit 114 may decrease the value of the parameter γij corresponding to the combination of the selected values αi and βj. In this case, the learning unit 114 increases the values of the parameter γ other than the parameter γij so that the sum total of the γ values becomes 1.

Thus, when there is no response to the incoming call and the incoming call has finished, the learning unit 114 updates the γ value, thereby enabling to increase the learning speed.

On the other hand, even if the user notices an incoming call, the user may not respond to the incoming call due to being busy, or the incoming call is from a person whom you need not answer. Thus, when the user does not respond to the incoming call, although having noticed the incoming call, if the learning unit 114 performs the process of decreasing the value of the parameter γij, incorrect learning is performed, and hence, the appropriate values of α and β may not be acquired. In this case, as shown in step S361 in FIG. 5, when there is no response to the incoming call and the incoming call has finished, the incorrect learning can be prevented by not updating the γ value.

Thus, when there is no response to the incoming call and the incoming call has finished, there is an advantage and a disadvantage in updating the γ value by the learning unit 114. In step S361, therefore, the user may set whether to update the γ value. In this case, a user, who does not respond often even if having noticed the incoming call, sets not to update the γ value, and a user, who often responds when having noticed the incoming call, sets to update the γ value.

As described above, the incoming call notification control unit 113 selects the value of the coefficient α of the incoming call notification start timing and the value of the coefficient β of the incoming call notification time. In accordance with the selected value, the vibration unit 180 repeats ON and OFF of the incoming call notification as shown in FIG. 2. As a result, the possibility that the user notices the incoming call notification can be increased by using such human perception characteristics that a changing state can be detected more easily than a steady state. Moreover, because the time during which the vibration unit 180 does not make the incoming call notification (OFF time) is set, power consumption of the mobile terminal device 1 can be reduced.

When the operating unit 170 receives the response operation to the incoming call, the learning unit 114 performs learning so that the probability that the incoming call notification control unit 113 selects the selected values of the coefficients α and β again is increased (that is, the learning unit 114 updates the value of the learning parameter γ). As a result, by increasing the probability that the vibration unit 180 makes the incoming call notification at the incoming call notification timing and the incoming call notification time, which have been proven to be such that the user will notice the incoming call notification, it can be expected that the user easily notices the incoming call notification. Thus, the mobile terminal device 1 can determine the timing for making the incoming call notification so that the user easily notices the incoming call notification.

That is, the incoming call notification start timing and the incoming call notification time at which the user easily notices the incoming call notification even during an action such as walking are learned by the mobile terminal device 1, thereby making it possible to make incoming call notification in accordance with the action cycle of the user (movement cycle T of the mobile terminal device 1). As a result, the possibility that the user does not notice the incoming call notification due to becoming confused by vibrations due to an action such as walking can be reduced.

Moreover, the learning unit 114 performs learning based on the presence of the response to the incoming call. Accordingly, because the user need not perform a special operation for learning, the user's burden does not increase. Furthermore, because the learning mode need not be provided, such an inconvenience where the user becomes conscious of learning and performs a different operation from the normal operation and the learning unit 114 cannot perform the appropriate learning does not occur.

Moreover, because the mobile terminal device 1 performs learning by storing and updating the learning parameter (selection probability) γ for each combination of the coefficients α and β, including a complicated structure for learning such as a neural network is not required. Accordingly, the size of the mobile terminal device 1 can be made compact, and an increase in power consumption due to the operation of a complicated structure can be avoided.

However, the learning method performed by the mobile terminal device 1 is not limited to the above-described method of storing and updating the learning parameter γ. As the learning method to be performed by the mobile terminal device 1, other methods such as using a neural network can be used.

Moreover, the mode selection unit 112 selects either the random selection mode or the learning result use mode. The incoming call notification control unit 113 selects the values of the coefficients α and β at random in the random selection mode. The incoming call notification control unit 113 selects the values of the coefficients α and β based on the learning parameter γ in the learning result use mode. By providing the random selection mode, when the learning result is not appropriate, the learning result can be diverged to some extent so that the learning result is not converged.

Moreover, in the case of the random selection mode, the learning unit 114 increases the learning degree more than in the case of the learning result use mode. That is, in the case of the random selection mode, the γ value is changed more largely based on the learning result. As a result, the learning result in the random selection mode is easily reflected to the γ value, and the effect of diverging the learning result to some extent can be easily acquired, so that the learning result is not converged, when the learning result is not appropriate as mentioned above.

Furthermore, the mode selection unit 112 increases the probability of selecting the learning result use mode, as the learning degree indicated by the value of the learning result is improved. For example, the mode selection unit 112 multiplies the standard deviation of the values γ11 to γmn by the preset coefficient δ (0<δ≤1), and selects the learning result use mode at the probability of the multiplication result value.

Thus, by increasing the probability of selecting the random selection mode as the bias of the γ distribution decreases, the probability of selecting the values of the coefficients α and β at random in a stage in which the learning does not progress is increased, and the learning can be performed based on various values of the coefficients α and β, that is, by selecting the values of the coefficients α and β evenly. As a result, the possibility of converging on an inappropriate learning result without even once performing the incoming call notification based on the appropriate coefficients α and β can be reduced.

As in step S182 in FIG. 4, even when the mobile terminal device 1 makes the incoming call notification in an incoming call notification pattern different from the movement cycle T, the learning unit 114 may perform the learning. For example, when the mobile terminal device 1 makes the incoming call notification in an incoming call notification pattern having a cycle other than the movement cycle T, the memory unit 130 stores each selection probability of a plurality of preset incoming call notification cycles (a cycle for repeating the incoming call notification pattern) in addition to the parameter γ shown in FIG. 3.

When there is a response to the incoming call, the learning unit 114 updates the γ value as with the case described above, and in addition, increases the selection probability of the selected incoming call notification cycle.

As a result, the incoming call notification control unit 113 can easily reselect the γ value and the incoming call notification cycle, which have been proven to be such that the user will notice the incoming call notification. Accordingly, as in the case above where the mobile terminal device 1 sets the incoming call notification start timing and the incoming call notification time corresponding to the movement cycle T, even if the mobile terminal device 1 makes the incoming call notification in the incoming call notification pattern different from the movement cycle, the timing of making the incoming call notification can be determined so that the user easily notices the incoming call notification.

Figure 6:
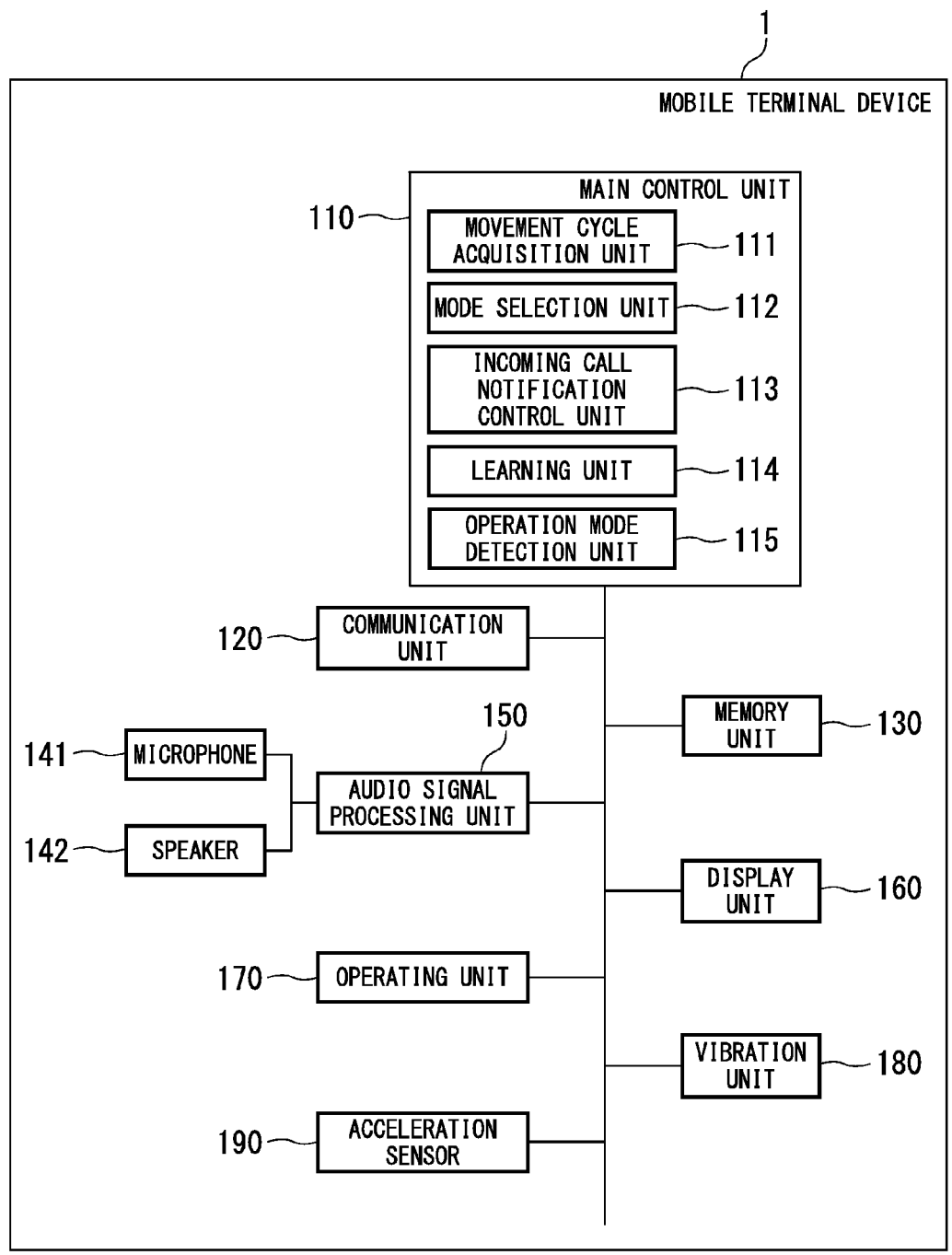
FIG. 6 is a configuration diagram showing a schematic configuration of a mobile terminal device in a modified example of the exemplary embodiment of the present invention.

The mobile terminal device 1 may detect a user's operation mode and learn the incoming call notification start timing and the incoming call notification time for each operation mode of the user. For example, in a modified example of the present exemplary embodiment shown in FIG. 6, the main control unit 110 further includes an operation mode detection unit 115. The operation mode detection unit 115 sets the user's operation mode to any of a walking mode, a brisk walking mode, and a running mode based on the movement cycle T of the mobile terminal device 1 acquired by the movement cycle acquisition unit 111. Specifically, the operation mode detection unit 115 is set to the running mode when the movement cycle T is equal to or larger than a predetermined running mode determination threshold, is set the operation mode to the walking mode when the movement cycle T is smaller than a predetermined walking mode determination threshold, and is set the operation mode to the brisk walking mode when the movement cycle T has an intermediate value therebetween.

The memory unit 130 stores the value of the parameter γ for each operation mode. When a response to the incoming call has been performed, the learning unit 114 updates the value of the parameter γ of the operation mode at that time.

Thus, the mobile terminal device 1 learns the incoming call notification start timing and the incoming call notification time for each operation mode of the user. Therefore, when the appropriate incoming call notification start timing and incoming call notification time are different for each operation mode, the probability of making the incoming call notification at the appropriate incoming call notification start timing and the incoming call notification time corresponding to the operation mode can be increased.

The applicable range of the present exemplary embodiments of the present invention is not limited to the incoming call notification at the time of receiving an incoming call. The present exemplary embodiments of the present invention can be applied to various types of notification to the user such as an incoming mail notification or an alarm function. When the present exemplary embodiments of the present invention are applied to various types of notification, the learning unit 114 may perform learning of the incoming call notification start timing and the incoming call notification time common to these various types of notification, or may perform learning of the incoming call notification start timing and the incoming call notification time for each type of notification.

For notification in which time for making the incoming call notification is comparatively short as in the incoming mail notification, the main control unit 110 may determine the presence of a response to the incoming mail based on whether the display unit 160 receives a response operation to the incoming mail within a certain time (for example, 30 seconds) since start of the incoming mail notification. Consequently, it can be determined more accurately whether the user has noticed the incoming mail notification, and learning can be performed more appropriately.

As described above, the main control unit 110 can be realized by executing the program by the CPU. Accordingly, the program for realizing all or a part of the functions of the main control unit 110 may be recorded in a computer readable recording medium, and the program recorded in the recording medium read and executed by a computer system to perform the processing of each unit. The "computer system" referred to herein includes an OS and hardware such as peripheral devices.

The "computer system" also includes a website offering environment (or display environment) when a WWW system is used.

The "computer readable recording medium" is a portable medium such as a flexible disk, a magneto-optical disk, a ROM, and a CD-ROM, and a memory device such as a hard disk incorporated in the computer system. The "computer readable recording medium" includes one dynamically holding a program for a short time such as a communication wire when the program is transmitted via a communication line such as a network, for example, the Internet, or a telephone line, and one holding the program for a certain time such as a volatile memory in the computer system, which becomes a server or a client in that case. A part of the functions may be realized by the program, or the functions may be realized by a combination of programs already recorded in the computer system.

The exemplary embodiments of the present invention have been described above in detail with reference to the drawings. However, the specific configuration is not limited to the exemplary embodiments, and also includes design changes that do not depart from the scope of the present invention.

This application is based upon and claims the benefit of priority from Japanese patent application No. 2010-241899 filed Oct. 28, 2010, the disclosure of which is incorporated herein in its entirety by reference.

INDUSTRIAL APPLICABILITY

The present invention can be applied to a mobile terminal device, a notification method when the mobile terminal device makes a notification to a user, and a program for the notification method. According to the device, the method, and the program, the timing at which the notification is made can be determined so that the user can easily notice the notification.

REFERENCE SYMBOLS

1 Mobile terminal device
110 Main control unit
111 Movement cycle acquisition unit
112 Mode selection unit
113 Incoming call notification control unit
114 Learning unit
115 Operation mode detection unit
120 Communication unit
130 Memory unit
141 Microphone
142 Speaker
150 Audio signal processing unit
160 Display unit
170 Operating unit
180 Vibration unit
190 Acceleration sensor

The invention claimed is:

1. A mobile terminal device comprising:
an event detection unit that detects an occurrence of a predetermined event;
a notification unit that makes a notification of the occurrence of the event to a user of the mobile terminal device;
an operating unit that receives a response operation with respect to the notification performed by the user of the mobile terminal device;
a movement cycle acquisition unit that acquires a pattern cycle of spatial movement of the mobile terminal device;
a learning unit that learns a notification timing and a notification time based on the pattern cycle and a result of whether the operating unit has received the response operation, the notification timing corresponding to a start timing of the notification, the notification time corresponding to a duration of the notification, the notification unit making the notification based on the notification timing and the notification time learned by the learning unit; and
a mode selection unit that selects either one of a random selection mode and a learning result use mode,
wherein the notification unit makes a notification based on a notification timing selected at random from a plurality of predetermined notification timings and a notification time selected at random from a plurality of predetermined notification times when the mode selection unit selects the random selection mode, and
the notification unit makes the notification based on a notification timing selected based on a selection probability set in accordance with the learning of the learning unit from a plurality of predetermined notification timings and a notification time selected based on a selection probability set in accordance with the learning of the learning unit from a plurality of predetermined notification times when the mode selection unit selects the learning result use mode.

2. The mobile terminal device according to claim 1, wherein, the learning unit increases, to a higher rate, a degree of changing a value of the selection probability according to a result of whether the operation unit has received the response operation when the mode selection unit selects the random selection mode than when the mode selection unit selects the learning result use mode.

3. The mobile terminal device according to claim 1, wherein the mode selection unit increases a probability of selecting the learning result use mode, as a learning degree indicated by a value of the selection probability progresses.

4. The mobile terminal device according to claim 1, further comprising:
an operation mode detection unit that detects an operation mode of the user of the mobile terminal device,
wherein the learning unit learns the notification timing and the notification time for each operation mode detected by the operation mode detection unit, and
the notification unit makes the notification based on the notification timing and the notification time selected according to the operation mode detected by the operation mode detection unit and the selection probability in the operation mode set in accordance with the learning of the learning unit.

5. A notification method comprising the step of:
detecting an occurrence of a predetermined event;
making a notification of the occurrence of the event to a user of a mobile terminal device;
receiving a response operation with respect to the notification performed by the user of the mobile terminal device;
acquiring a pattern cycle of spatial movement of the mobile terminal device;
learning a notification timing and a notification time based on the pattern cycle and a result of whether the response operation has been received, the notification timing corresponding to a start timing of the notification, the notification time corresponding to a duration of the notification, in the step of making the notification, the notification being made based on the notification timing and the notification time learned in the step of learning; and
selecting either one a random selection mode and a learning result use mode,
wherein, in the step of making the notification, the notification is made based on a notification timing selected at random from a plurality of predetermined notification timings and a notification time selected at random from a plurality of predetermined notification times when the random selection mode is selected in the step of selecting the mode, and
the notification is made based on a notification timing selected based on a selection probability set in accordance with the learning in the step of learning from a plurality of predetermined notification timings, and a notification time selected based on a selection probability set in accordance with the learning in the step of learning from a plurality of predetermined notification times when the learning result use mode is selected in the step of selecting the mode.

6. The notification method according to claim 5, wherein in the step of learning, a degree of changing a value of the selection probability according to a result of whether the response operation has been received is increased to a higher rate when the random selection mode is selected in the step of selecting the mode than when the learning result use mode is selected in the step of selecting the mode.

7. The notification method according to claim 5, further comprising the step of:
detecting an operation mode of the user of the mobile terminal device,
wherein, in the step of learning, the notification timing and the notification time are learned for each operation mode detected in the step of detecting the operation mode, and
in the step of making the notification, the notification is made based on the notification timing and the notification time selected according to the operation mode detected in the step of detecting the operation mode, and the selection probability in the operation mode set in accordance with the learning in the step of learning.

8. A computer readable non-transitory recording medium storing a program causing a mobile terminal device to execute the steps of:
detecting an occurrence of a predetermined event;
making a notification of the occurrence of the event to a user of the mobile terminal device;
receiving a response operation with respect to the notification performed by the user of the mobile terminal device;
acquiring a pattern cycle of spatial movement of the mobile terminal device; and
learning a notification timing and a notification time based on the pattern cycle and a result of whether the response operation has been received, the notification timing corresponding to a start timing of the notification, the notification time corresponding to a duration of the notification,
in the step of making the notification, the notification being made based on the notification timing and the notification time learned in the step of learning; and
selecting either one of a random selection mode and a learning result use mode,
wherein, in the step of making the notification, the notification is made based on a notification timing selected at random from a plurality of predetermined notification timing and a notification time selected at random from a plurality of predetermined notification times when the random selection mode is selected in the step of selecting the mode, and
the notification is made based on a notification timing selected based on a selection probability set in accordance with the learning in the step of learning from a plurality of predetermined notification timings when the learning result use mode is selected in the step of selecting the mode.

* * * * *